United States Patent [19]
Koizumi

[11] Patent Number: 5,592,532
[45] Date of Patent: Jan. 7, 1997

[54] WIRELESS TELEPHONE SYSTEM WITH MESSAGE STORAGE FOR PLURAL TELEPHONES

[75] Inventor: Shigeru Koizumi, Urawa, Japan

[73] Assignee: Canon Kabushiki Kaisha, Tokyo, Japan

[21] Appl. No.: 296,972

[22] Filed: Aug. 26, 1994

Related U.S. Application Data

[63] Continuation of Ser. No. 866,193, Apr. 9, 1992, abandoned.

[30] Foreign Application Priority Data

Apr. 12, 1991 [JP] Japan .................................. 3-108437
Feb. 21, 1992 [JP] Japan .................................. 4-035024

[51] Int. Cl.[6] .................................................. H04M 11/00
[52] U.S. Cl. ........................... 379/58; 379/61; 379/62; 379/63
[58] Field of Search ............................ 379/58, 59, 60, 379/61, 67, 69, 88, 89, 62, 63; 455/33.1

[56] References Cited

U.S. PATENT DOCUMENTS

| | | | |
|---|---|---|---|
| 4,408,099 | 10/1983 | Ishii | 379/57 |
| 4,481,382 | 11/1984 | Villa-Real | 379/61 |
| 4,500,752 | 2/1985 | Lee | 379/63 |
| 4,677,655 | 6/1987 | Hashimoto | 379/61 |
| 4,682,351 | 7/1987 | Makino | 379/61 |
| 4,766,604 | 8/1988 | Axberg | 379/69 |
| 4,802,200 | 1/1989 | Murata et al. | 379/61 |
| 4,873,713 | 10/1989 | Yamanouchi | 379/67 |
| 4,875,229 | 10/1989 | Palett et al. | 379/58 |
| 4,885,577 | 12/1989 | Nelson | 340/825.44 |
| 4,941,168 | 7/1990 | Kelly | 379/69 |
| 4,942,598 | 7/1990 | Davis | 379/67 |
| 5,050,206 | 9/1991 | Shimanuki | 379/67 |
| 5,073,928 | 12/1991 | Shimanuki | 379/70 |
| 5,075,894 | 12/1991 | Iwase | 379/69 |
| 5,081,668 | 1/1992 | Ito | 379/58 |
| 5,105,458 | 4/1992 | Takeneka | 379/58 |
| 5,109,220 | 4/1992 | Breeden et al. | 379/57 |
| 5,172,404 | 12/1992 | Hashimoto | 379/88 |
| 5,220,594 | 6/1993 | Ohnishi | 379/61 |
| 5,313,516 | 5/1994 | Afshar | 379/88 |
| 5,321,739 | 6/1994 | Higashiyama | 379/67 |

FOREIGN PATENT DOCUMENTS

| | | | |
|---|---|---|---|
| 2045800 | 3/1992 | Canada | 379/58 |
| 109929 | 4/1989 | Japan | 379/58 |
| 60-30110 | 2/1994 | Japan | 379/58 |
| 2227394 | 7/1990 | United Kingdom . | |

*Primary Examiner*—Wellington Chin
*Assistant Examiner*—Vijay Shankar
*Attorney, Agent, or Firm*—Fitzpatrick, Cella, Harper & Scinto

[57] ABSTRACT

A wireless telephone system includes plural phones, each having a radio transmitting/receiving unit and a storage unit for recording and reproducing incoming messages, and a base unit connected to a telephone line that communicates by radio with the plural phones. In one arrangement, the base unit selects a desired phone and the selected phone records the incoming message. In another arrangement, the plural phones do not include storage units and base unit is adapted to select a desired phone according to a DTMF signal and to record an incoming message corresponding to the selected phone in a storage unit. The base unit reads out the stored incoming message in response to a designation from the selected phone, transmits the message to the phone and the incoming message is reproduced by the selected phone.

44 Claims, 11 Drawing Sheets

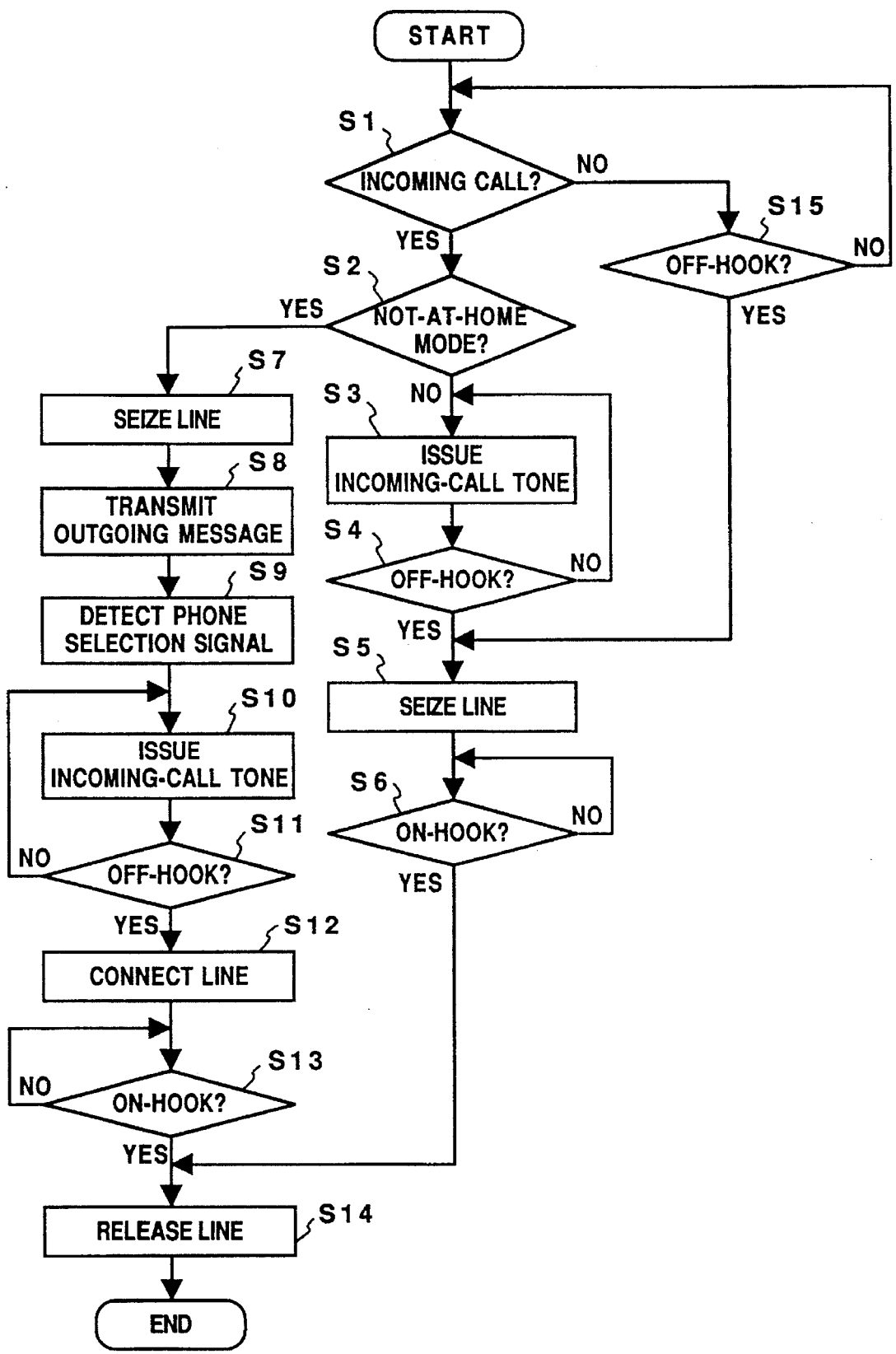
F I G. 4

WIRELESS TELEPHONE SYSTEM WITH MESSAGE STORAGE FOR PLURAL TELEPHONES

This application is a continuation of application Ser. No. 07/866,193 filed Apr. 9, 1992, now abandoned.

BACKGROUND OF THE INVENTION

1. Field of the Invention

The present invention relates to a wireless telephone system, and more particularly, to a wireless telephone system having an answering mechanism.

2. Prior Art

Conventionally, a wireless communication system having a plurality of phones (portable) and a base unit connected to a telephone line is known. In this system, each of the phones includes a radio transmitting/receiving unit, and the base unit also includes a radio transmitting/receiving unit. The transmission and reception of a message between each of the phones and the base unit are performed using the transmitting/receiving units. A user can carry one of the phones and talk on the phone using a radio system.

In the above system, the base unit has an automatic answering mechanism which includes a recording/reproduce unit for recording and reproducing an incoming message when the user of any phone of the plural phones is absent. This recording/reproduce unit of the answering mechanism in the base unit records incoming messages sequentially.

In the conventional system, even an incoming message to a specific person is recorded in the recording/reproduce unit of the answering mechanism in the base unit, since only the base unit has the answering mechanism. For this reason, there is a problem that a person who is not concerned with this message can listen stealthily to the recorded message.

SUMMARY OF THE INVENTION

In view of the aforementioned problem of the conventional system, an object of the present invention is to provide a wireless telephone system which records and reproduces an incoming message preventing a third person from listening to the message.

In order to achieve the above object, the wireless telephone system has a plurality of phones each of which includes a radio transmitting/receiving unit and a base unit which is connected to a telephone line and which includes a radio transmitting/receiving unit for communicating with the plurality of phones, wherein each of the plurality of phones comprises storage means for storing an incoming message which includes recording means for recording the incoming message and reproduce means for reproducing the recorded message.

According to an aspect of the present invention, a desired phone is selected among the plurality of the phones and an incoming message is recorded with the storage means of the selected phone. As a signal for selecting one of the phones, a DTMF (dual tone multi-frequency) signal is used and each of the storage means has an LSI (large scale integrated circuit).

Another object of the present invention is to provide a wireless telephone system having a plurality of phones each of which includes a radio transmitting/receiving unit and a base unit which is connected to a telephone line and which includes a radio transmitting/receiving unit for communicating with the plurality of phones, wherein the base unit comprises selection means for selecting a desired phone among the plurality of phones, recording means for recording an incoming message corresponding to the one of the plurality of phones selected by the selection means, read-out means for reading out the incoming message recorded by the recording means and message transmission means for transmitting the incoming message read out by the read-out means to the phone selected by the selection means, and each of the plurality of phones comprises read-out designating means for designating the base unit to read out the incoming message recorded by the recording means and reproduce means for reproducing the incoming message transmitted by the message transmission means of the base unit.

The present invention can record an incoming message corresponding to a desired phone among plurality of phones and reproduce the recorded message in the desired phone. In the present invention, when a user of one phone is absent, if a caller knows who is an user for the phone, the caller can leave any significant or private message toward the phone so that only the user of the phone can listen to the recorded message.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a flowchart illustrating the processing operation of the base unit in the wireless telephone system according to the first embodiment;

DETAILED DESCRIPTION OF THE PREFERRED EMBODIMENTS

Preferred embodiments of the present invention will be described in accordance with the accompanying drawings.
[First Embodiment]

Figure 1:
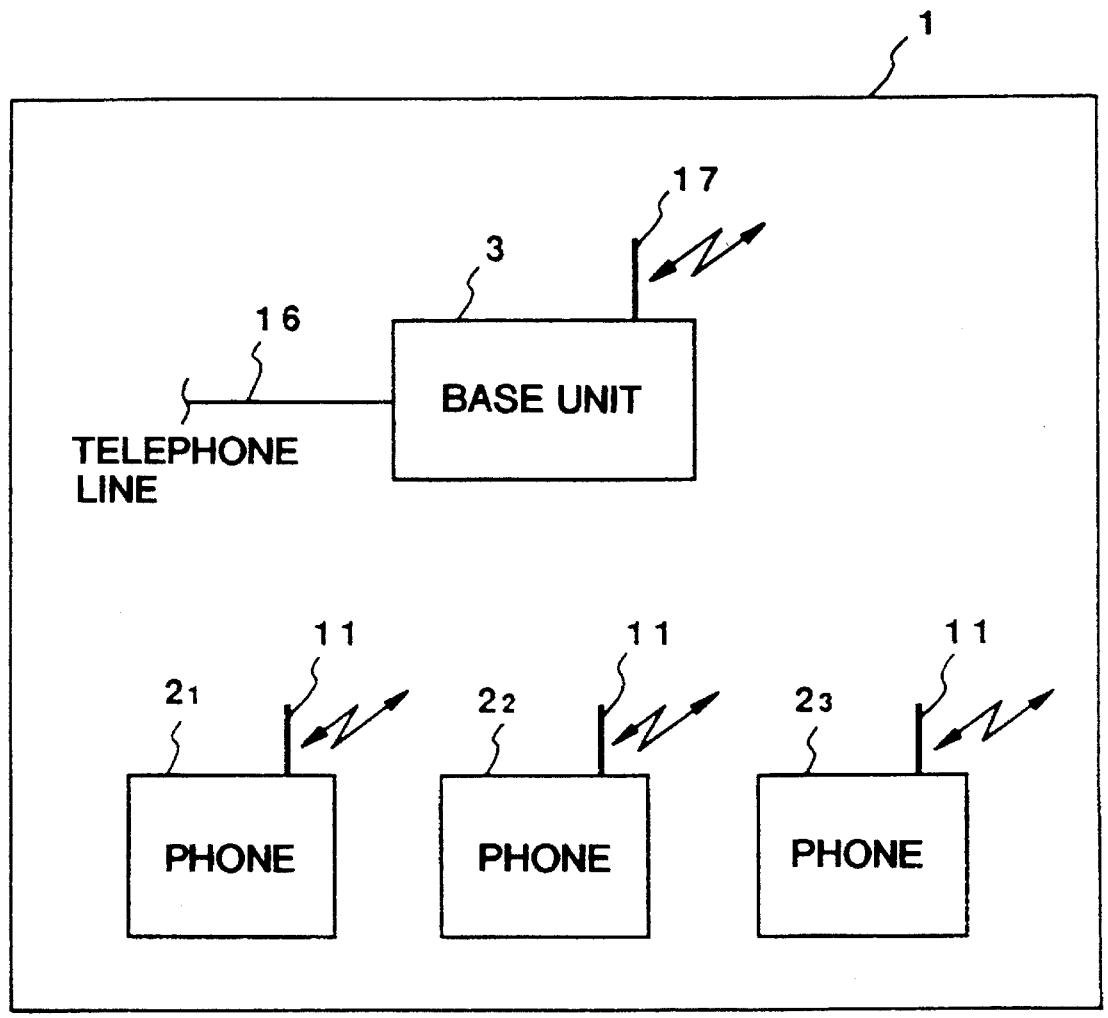
FIG. 1 is a block diagram showing a system configuration of a wireless telephone system according to the first, the second and the third embodiments of the present invention.

FIG. 1 illustrates a system configuration of a wireless telephone system according to the present invention. In FIG. 1, a wireless telephone system 1 has a plurality (three phones in this embodiment) of phones (portable) $2_1$, $2_2$ and $2_3$ and a base unit 3.

Figure 2:
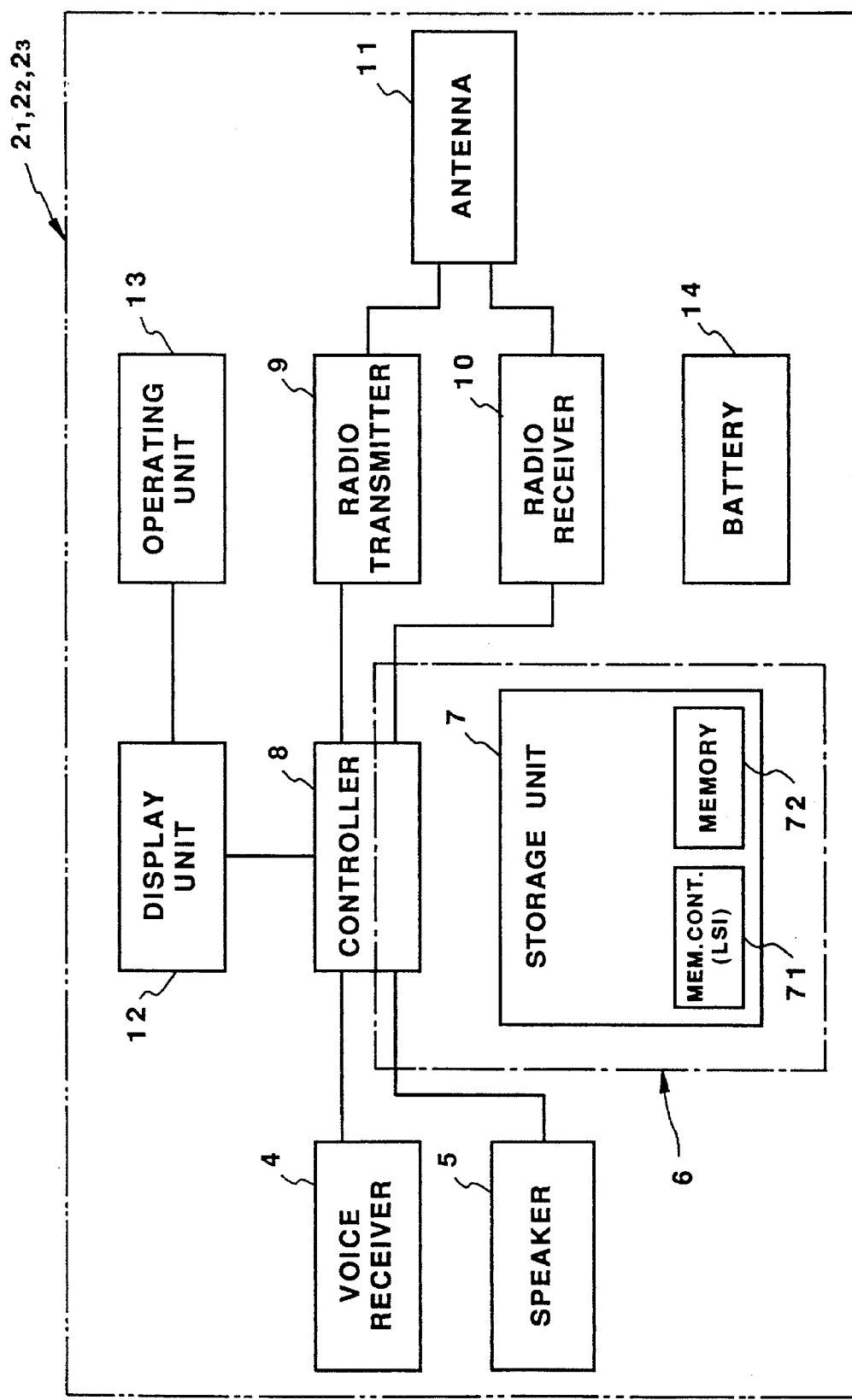
FIG. 2 is a block diagram showing the construction of a phone in the wireless telephone system according to the first and the third embodiments.

The phones $2_1$, $2_2$ and $2_3$ have the same construction shown in FIG. 2. A voice receiver 4 including an electret condenser microphone, a dynamic microphone and the like inputs a voice incoming message. A speaker 5 outputs a received incoming message or a recorded outgoing message as a voice message. An answering mechanism 6 which has a storage unit 7 automatically records an incoming message to a user who is absent and automatically reproduces the recorded message. More specifically, the storage unit 7 includes an LSI memory circuit 71 which records and reproduces an incoming voice message and a memory 72 which stores a digital signal converted from the incoming message. Even when the phones $2_1$ to $2_3$ are away from the base unit 3, the answering mechanism 6 is able to record and reproduce an incoming message received via the base unit. The storage unit 7 in the answering mechanism 6 is controlled by a controller 8.

The controller 8 which controls the phone 2 (a generic term for the phones $2_1$ to $2_3$ includes a CPU (central processing unit), a ROM (read only memory), a RAM (random access memory), a PIO (parallel I/O) and the like (not shown). The voice receiver 4, the speaker 5 and the storage unit 7 are respectively connected to the controller 8. Similarly, a display unit 12, a radio transmitter 9 and a radio receiver 10 are respectively connected to the controller 8. The radio transmitter 9 converts a voice signal to a radio wave and emits the radio wave. The radio receiver 10 receives a radio wave, detects and demodulates a voice signal, thereafter outputs the voice signal.

The radio transmitter 9 and the radio receiver 10 are connected to an antenna 11 for radio transmission/reception. The antenna 11 consists of an antenna such as helical antenna. The phone 2 communicates with the base unit using the radio transmitter 9, the radio receiver 10 and the antenna 11. The display unit 12, connected to the controller 8, includes all LCD (liquid crystal display), an LED (light emitting diode) and the like. The display unit 12 displays various information such as a status of the wireless telephone system 1, the reception of an incoming-call and a not-at-home mode. An operating unit 13 for various operations such as mode setting is connected to the display unit 12. A battery 14 is a power source of the phone 2.

Figure 3:
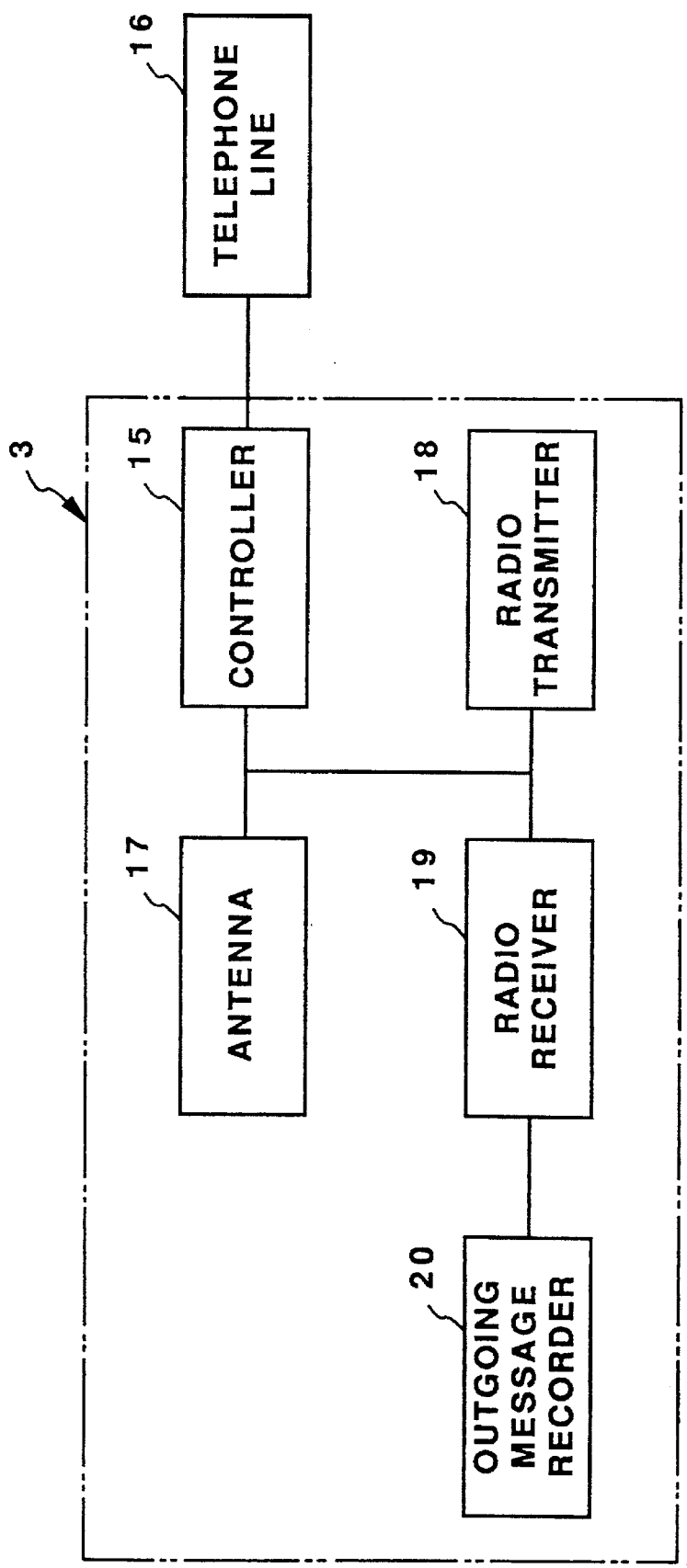
FIG. 3 is a block diagram showing the construction of a base unit in the wireless telephone system according to the first and the third embodiments.

FIG. 3 illustrates the construction of the base unit 3. A controller 15 controls the base unit 3. A telephone line 16 and an antenna 17 are connected to the controller 15. The telephone line 16 is connected to a telephone network and the antenna 17 is used for radio transmission/reception. A radio transmitter 18 and a radio receiver 19 are connected between the controller 15 and the antenna 17. The base unit 3 communicates with the phone 2 using the radio transmitter 18, the radio receiver 19 and the antenna 17. An outgoing message recorder 20 is connected to the radio receiver 19.

The outgoing message recorder 20 records and reproduces an outgoing message by a user of each phone. When the base unit 3 receives an incoming call and the user is absent, the base unit 3 reproduces a recorded outgoing message to the caller.

The processing operation of the base unit 3 in the above construction will be explained in accordance with the flowchart of FIG. 4. More specifically, the operation described in the flowchart of FIG. 4 is carried out by the controller 15.

At first, in step S1, the base unit 3 examines whether there is an incoming call from the telephone line 16. When an incoming call arrives, the base unit examines whether any one of the phones $2_1$ to $2_3$ is set to a not-at-home mode in step S2. Note that this examination is performed on the condition where the base unit 3 has information on the statuses of each of the phones. When a phone is set to a not-at-home mode, the phone informs the base unit 3 of the setting of the not-at-home mode and the base unit 3 stores the information. If the base unit 3 finds a phone in the not-at-home mode, the base unit 3 seizes the telephone line 16 in step S7, reproduces an outgoing message recorded in the outgoing message recorder 20 and transmits the message to the telephone line 16 in step Within a predetermined time period in which the outgoing message is transmitted or within a predetermined time period after the transmission of the outgoing message, the base unit 3 detects a phone selection signal for selecting a phone through the radio receiver 19. On the basis of the detected phone selection signal, the base unit 3 specifies a phone for which the base unit 3 records an incoming message from the calling side in step S9. This phone selection signal is a DTMF signal, and each phone has an individual signal registered in the base unit 3. As the phone corresponding to the received phone selection signal is an addressee of an incoming message, the phone selected in step S9 is referred to as an addressee phone.

When the transmission of the outgoing message and the reception of the phone selection signal have been finished, the base unit 3 transmits an incoming-call signal from the radio transmitter 18 to the addressee phone in step S10. The addressee phone detects the incoming-call signal and issues an incoming-call tone from the speaker 5.

If the addressee phone is set to the not-at-home mode, on reception of the incoming-call signal, the addressee phone issues the incoming-call tone a predetermined number of times and sets the addressee phone to off-hook status. The addressee phone informs the base unit 3 of the off-hook status of the addressee phone. In step S11, the controller 15 confirms whether the status of the phone to which the incoming-call signal has been sent in step S10 is off-hook. If the phone is not in the off-hook status, the processing returns to step S10. If the phone is in the off-hook status, the base unit 3 connects the addressee phone in the off-hook status with the telephone line 16 in step S12.

When the line is connected, in step S13, the base unit 3 monitors the addressee phone until the status of the addressee phone becomes on-hook again. On detection of the on-hook status of the addressee phone, the base unit 3 disconnects the line in step S14 and thus ends the processing operation.

On the other hand, in step S2, if the base unit 3 does not find any phone in the not-at-home mode, it transmits an incoming-call signal to all or at least one of the phones $2_1$ to $2_3$ in step S3. The phone which received the incoming-call signal issues an incoming-call tone. Thereafter the base unit 3 examines which phone is set to the off-hook status in step S4. If there is no phone in the off-hook status, the processing returns to step S3. If the base unit 3 finds one of them in off-hook status, the base unit 3 seizes the telephone line 16 in step S5. Then in step S6, the base unit examines the status of the connected phone till it becomes on-hook again. On detection of the on-hook status, the base unit releases the line and thus finishes the processing operation in step S14.

In step S1, when the base unit receives no incoming call from the telephone line 16, the base unit waits for any one of the phones $2_1$ to $2_3$ to be in the off-hook status in step S15. If none of them becomes off-hooked, the processing returns to step S1. If one of them becomes off-hooked, the processing proceeds to step S5 where the base unit connects the phone with the telephone line 16.

Figure 5:
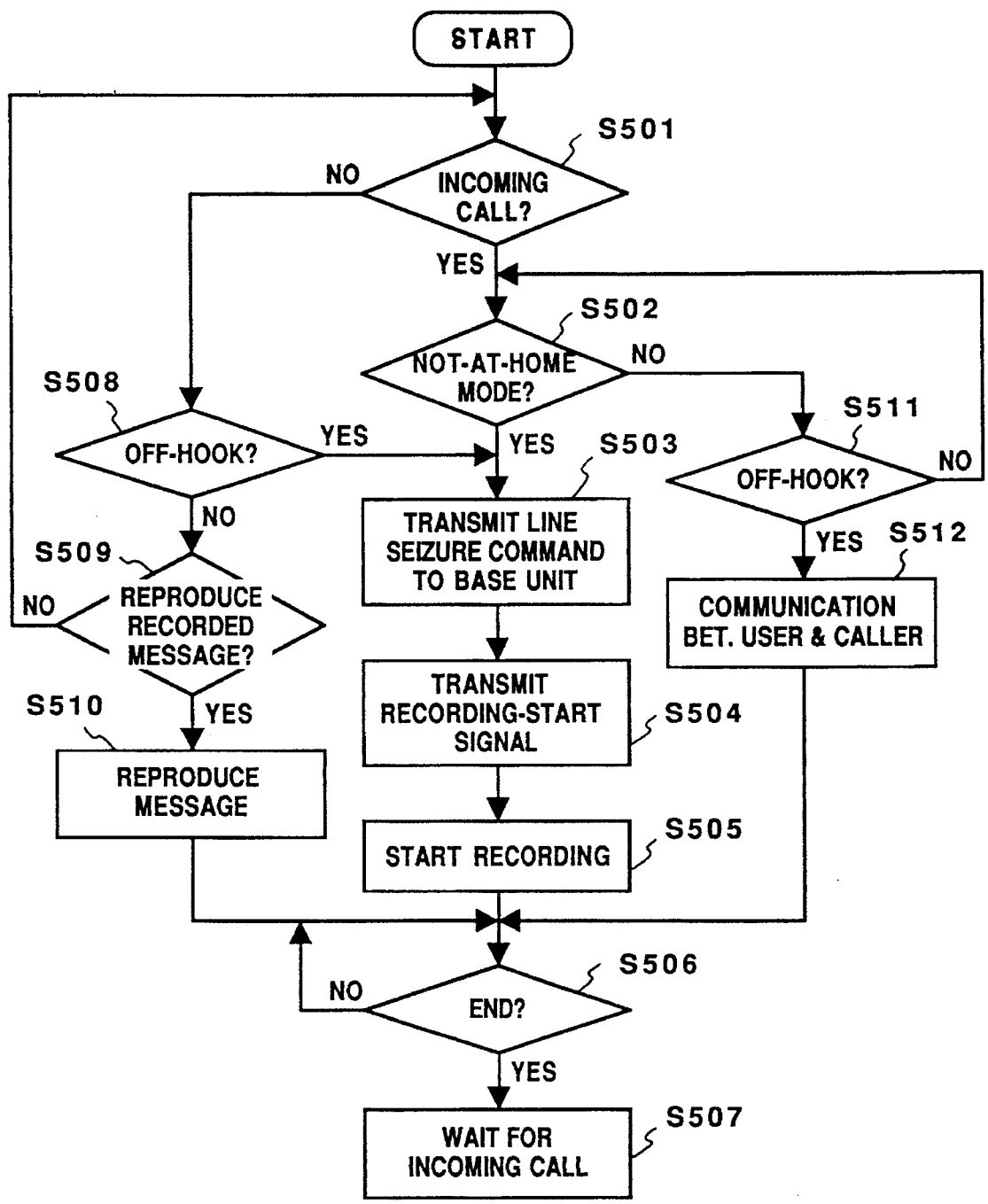
FIG. 5 is a flowchart illustrating the processing operation of the phone in the wireless telephone system according to the first embodiment.

Next, the processing operation of the phone 2 will be explained in accordance with the flowchart of FIG. 5. The operation described in the flowchart of FIG. 5 is carried out by the controller 8.

On arrival of an incoming-call signal from the base unit 3, the controller 8 confirms whether the base unit 3 has received an incoming call from the telephone line 16 in step S501. If it is confirmed that there is an incoming call, the controller 8 examines whether the current mode of the phone 2 is not-at-home in step S502. If the phone 2 is in the not-at-home mode, the controller 8 transmits a line connection command to the base unit 3 in step S503. The controller 8 transmits a calling side recording-start signal which informs the caller of the start of recording of an incoming message in step S504 and starts to record an incoming message from the caller in the storage unit 7 in step S505. When the recording is started, the controller 8 waits for the end of the recording in step S506. When the recording ends, the controller 8 waits for another incoming-call signal.

In step S502, if the phone 2 is not in the not-at-home mode, when the status of the phone becomes off-hook (step S511), the controller 8 transmits the line seizure command to the base unit 3 for communication between the user and the caller in step S512 and the processing proceeds to steps S506 and S507.

In step S501, if the controller 8 confirms there is no incoming call, the controller 8 examines whether the current status of the phone 2 is off-hook in step S508. If the phone is in off-hook status, the processing proceeds to step S503. If it is on-hook, the controller 8 examines whether a message reproduce button in the operation unit 13 is pressed, i.e., whether a command to reproduce an incoming message recorded in the storage unit 7 is issued in step S509. If the reproduce of recorded message is not commanded, the processing returns to step S501. If the reproduce command has been issued, the controller 8 reproduces a recorded incoming message in step S510. The controller 8 waits till the reproduce of the message ends in step S506 and then waits another incoming-call signal.

In step S506, the controller 8 determines termination of the communication on the basis of detection of non-communication state by the base unit 3. For example, if the base unit detects a polarity reversal of the telephone line or a predetermined length of silence, the controller 8 determines that the caller has hung up.

As described above, as each of the phones $2_1$ to $2_3$ has answering mechanism 6 including the storage unit 7, the phones can reproduce a recorded incoming message respectively. The user can listen to an incoming message recorded toward the user's phone. Incoming messages can be reproduced in the phones $2_1$ to $2_3$ at the same time.

[Second Embodiment]

Figure 6:
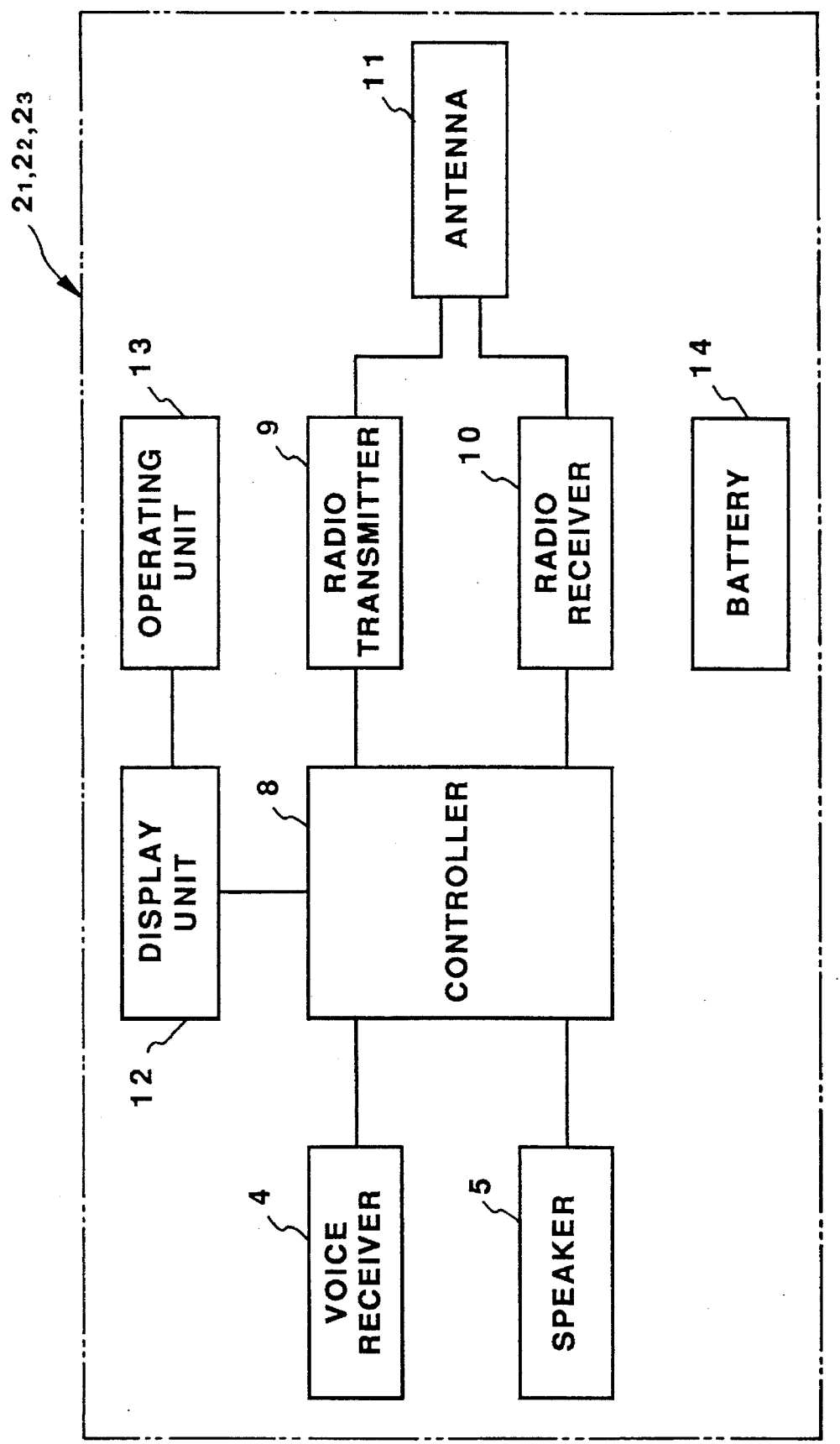
FIG. 6 is a block diagram showing the construction of a phone in the wireless telephone system according to the second embodiment.
Figure 7:
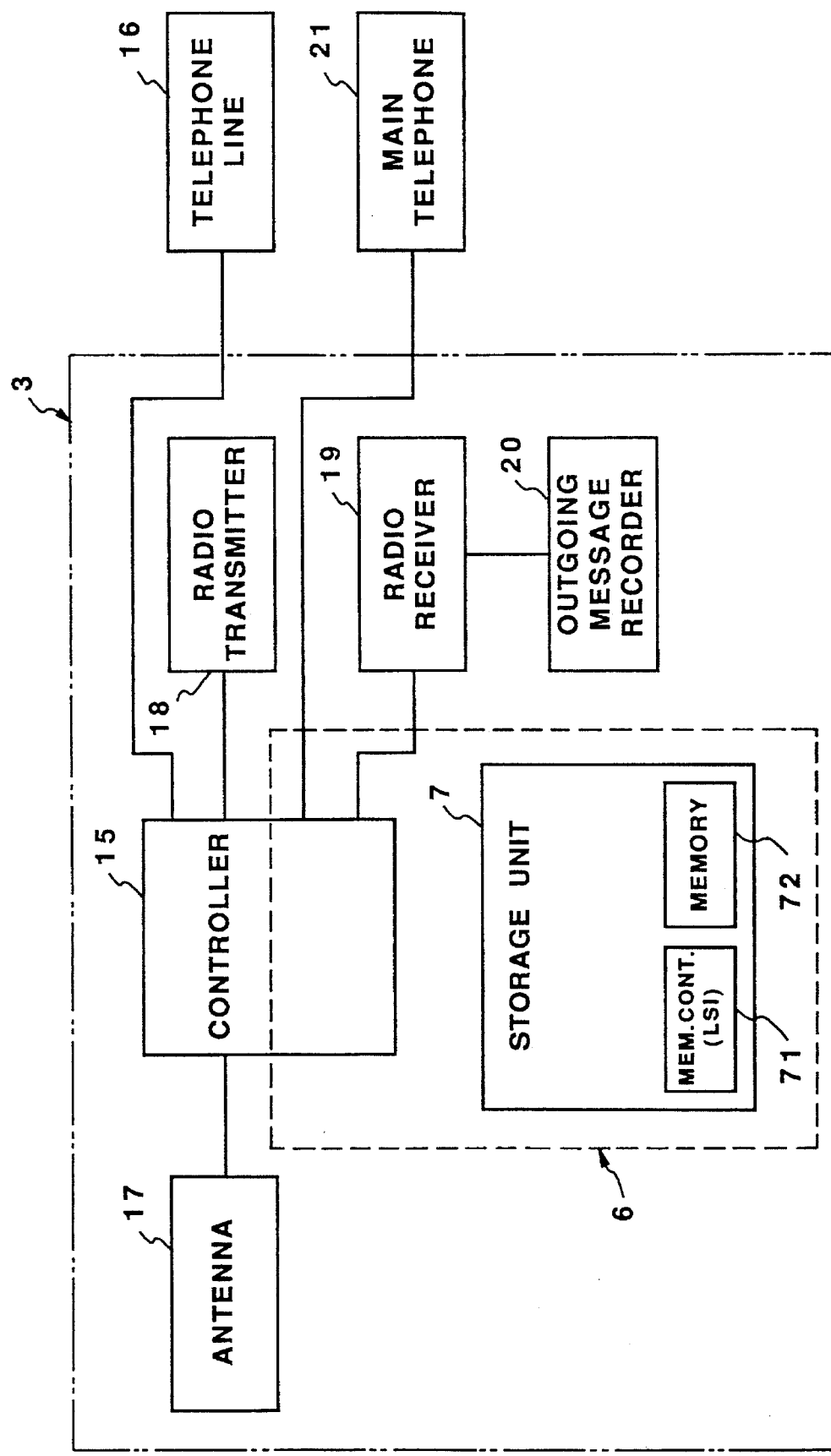
FIG. 7 is a block diagram showing the construction of the base unit in the wireless telephone system according to the second embodiment.

The second embodiment will be described below with reference to FIGS. 1, 6–10. The system configuration of the wireless telephone system according to the second embodiment is the same as that of the first embodiment as shown in FIG. 1. In FIGS. 6 and 7, elements with like reference numerals are corresponding parts to those of the first embodiment and detailed explanations will be omitted.

FIG. 6 illustrates the construction of the phone 2 according to the second embodiment. FIG. 7 illustrates the construction of the base unit 3 according to the second embodiment. As shown in FIGS. 6 and 7, the phone 2 lacks the storage unit 7. Instead, the base unit 3 comprises the storage unit 7 connected to the controller 15. The base unit 3 further comprises a main telephone 21.

Figure 10:
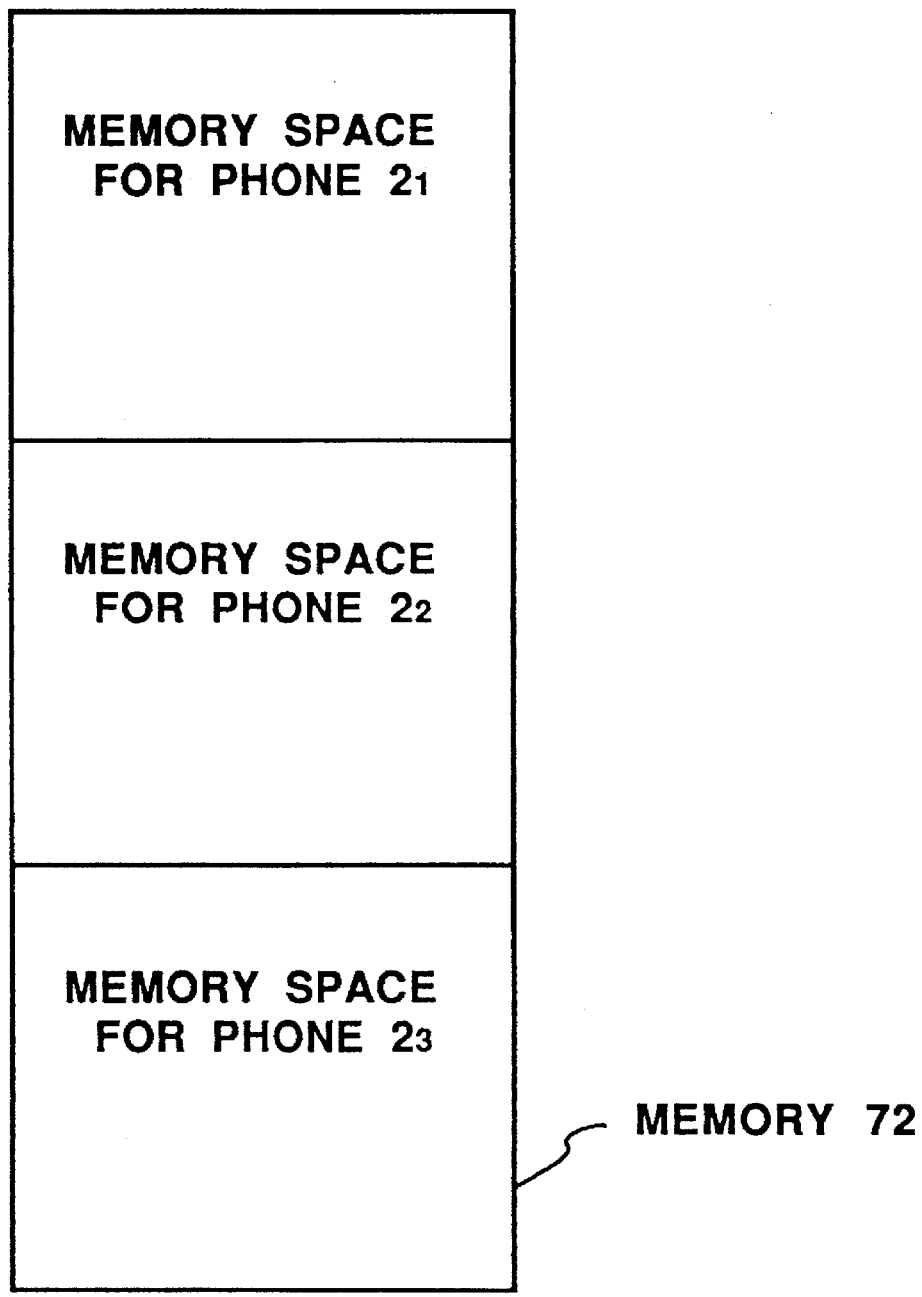
FIG. 10 is a diagram showing an example of the memory space allocation of a memory in a storage unit of the wireless telephone system according to the second embodiment.

In FIG. 7, the answering mechanism 6 having the storage unit 7 automatically records and reproduces an incoming message to the user when the user is absent. In FIG. 10, the memory 72 is divided into a plurality of memory spaces corresponding to the number of the phones $2_1$ to $2_3$ and the memory spaces are respectively assigned to the phones $2_1$ to $2_3$. The answering mechanism 6 has a function to reproduce a recorded message in the phone 2 via the base unit 3, even when the phone 2 is away from the base unit 3. The storage unit 7 in the answering mechanism 6 is controlled by the controller 15.

According to the second embodiment, since the main telephone 21, a subscriber of the general telephone network, communicates with one of the phones $2_1$ to $2_3$ which belong to this wireless telephone system, the communication between the base unit 3 and the phones $2_1$ to $2_3$ is carried out in a multiple address calling method. The base unit 3 calls the phones $2_1$ to $2_3$ at once, or the base unit 3 calls them separately. The phone 2 is called directly from the public telephone network and is called with an additional dial operation from the public telephone network. Further the phone 2 is called with a dial operation of the telephone 21 connected to the base unit 3 or with a manual operation of the base unit 3.

Figure 8:
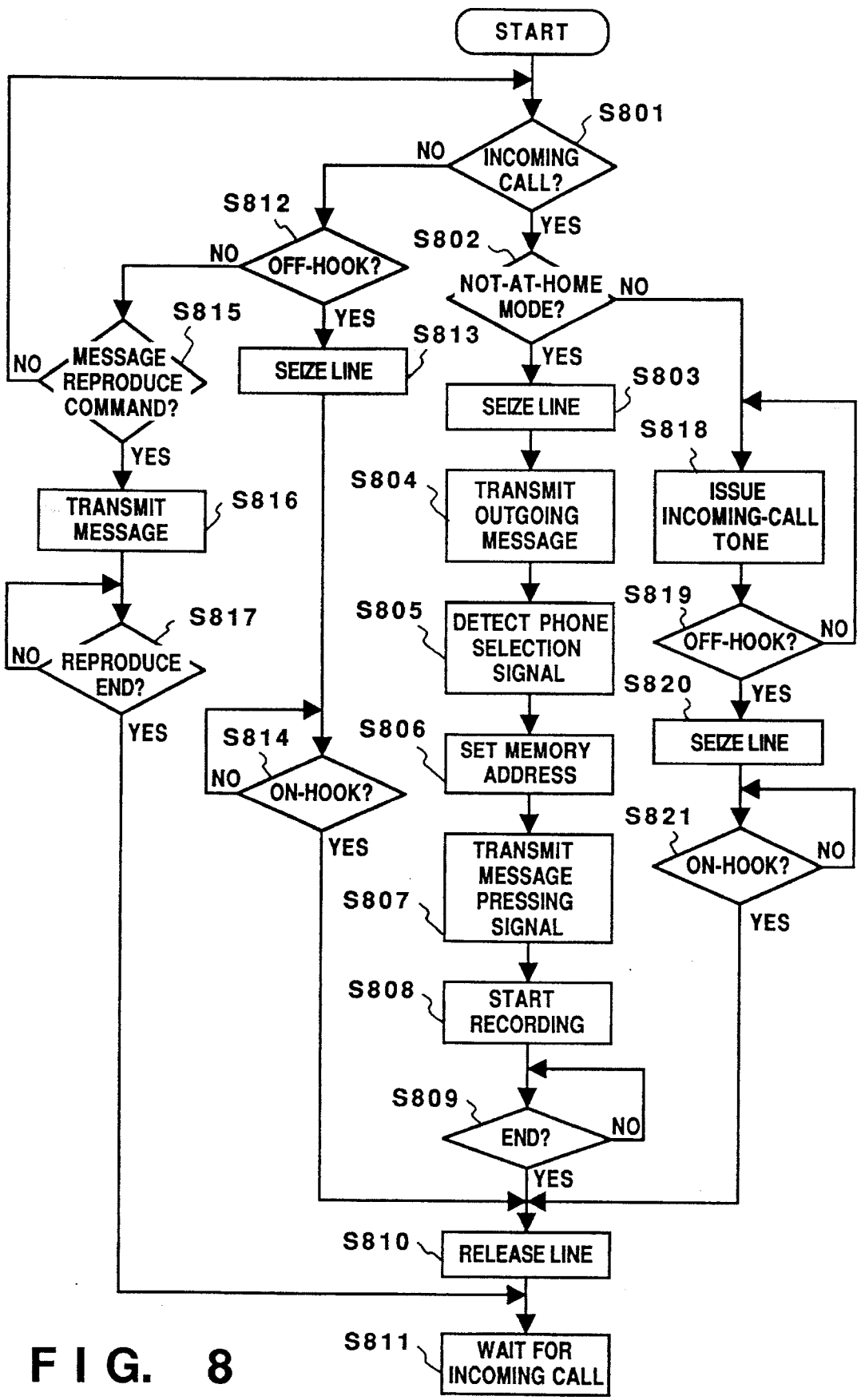
FIG. 8 is a flowchart illustrating the processing operation of the base unit in the wireless telephone system according to the second embodiment.

The processing operation of the base unit 3 in the above wireless telephone system will be explained in accordance with the flowchart of FIG. 8. The operation described in the flowchart of FIG. 8 is carried out by the controller 15.

First, the controller 15 waits for an incoming call from the telephone line 16 in step S801. When an incoming call arrives, the controller 15 examines whether any one of the phones $2_1$ to $2_3$ is set to a not-at-home mode in step S802. If the controller 15 finds a phone in the not-at-home mode, it seizes the telephone line 16 in step S803. The controller 15 reproduces an outgoing message recorded in the outgoing message recorder 20 and transmits the message to the telephone line 16 in step S804.

Within a predetermined time period in which the outgoing message is transmitted or within a predetermined time period after the transmission of the outgoing message, the controller 15 detects a phone selection signal for selecting an addressee of the message from a calling side through the radio receiver 19 in step S805. The addressee is one of the phones $2_1$ to $2_3$. The phone selection signal is a DTMF signal. Each of the phones $2_1$ to $2_3$ has an individual signal registered in the controller 15. As the phone corresponding to the received phone selection signal is an addressee of an incoming message, the phone selected in step 805 is referred to as an addressee phone.

When the phone selection signal is detected, the controller 15 sets an address in one memory space assigned to the addressee phone as the address for recording the incoming message in step S806.

When this preparatory step for the recording of the incoming message is completed, in step S807, the controller 15 transmits a recording message pressing signal from the answering mechanism 6 to the caller. This message informs the caller of the start of the recording and urges the caller to send a message. In step S808, the controller 15 starts to record an incoming message from the calling side in the address in the memory 72 set in step S806.

When the recording starts, the controller 15 waits for the end of the recording in step S809 and releases the line in step S810. Again the controller 15 waits for another incoming call in step S811.

On the other hand, in step S802, if none of the phones $2_1$ to $2_3$ is in the not-at-home mode, the controller 15 transmits an incoming-call tone issuing command from the radio transmitter 18 to all the phones in step S818. After the controller 15 has informed the phones of the arrival of the incoming call, the controller 15 examines whether any one of the phones $2_1$ to $2_3$ is in off-hook status in step S819. If there is no phone in the off-hook status, the processing returns to step S818. If the controller 15 finds one in the off-hook status, the controller 15 seizes the telephone line 16 in step S820 for communication between the user and the caller.

In step S821, the controller 15 waits for on-hook status of the phone in communication. On detection of the on-hook status of the phone, the controller 15 disconnects the line in step S810 and awaits another incoming call in step S811.

In step S801, if there is no incoming call, the controller 15 examines the status of the telephone 21 connected to the base unit 3 and the phones $2_1$ to $2_3$ in step S812. If the telephone 21 or one of the phones $2_1$ to $2_3$ is in off-hook status, the controller 15 connects the phone in the off-hook status with the telephone line 16 in step S813. In this case, the phone in the off-hook status is manually dialed for a telephone call. The processing also proceeds to steps S810 and 811.

In step S812, if none of the phones $2_1$ to $2_3$ and the telephone 21 is in the off-hook status, the controller 15 examines whether there is a message reproduce command from any one of the phones $2_1$ to $2_3$ in step S815. If there is no message reproduce command, the processing returns to step S801. If the base unit 3 has received the message reproduce command from one of the phones $2_1$ to $2_3$, the controller 15 discriminates the phone by an ID code included in the message relay command. The controller 15 reads out an incoming message corresponding to the phone from the storage unit 7 and transmits the message to the phone in step S816. As described above, the memory 72 has memory spaces respectively assigned to the phones $2_1$ to $2_3$. Each incoming message is stored in the corresponding memory space. Accordingly, if the phone which has transmitted a message reproduce command is specified, the memory space for the phone can be specified. The message read out of the corresponding memory space is the message to be reproduced.

In step S809, the termination of the call can be detected by polar inversion of the telephone line or a predetermined length of silence.

Figure 9:
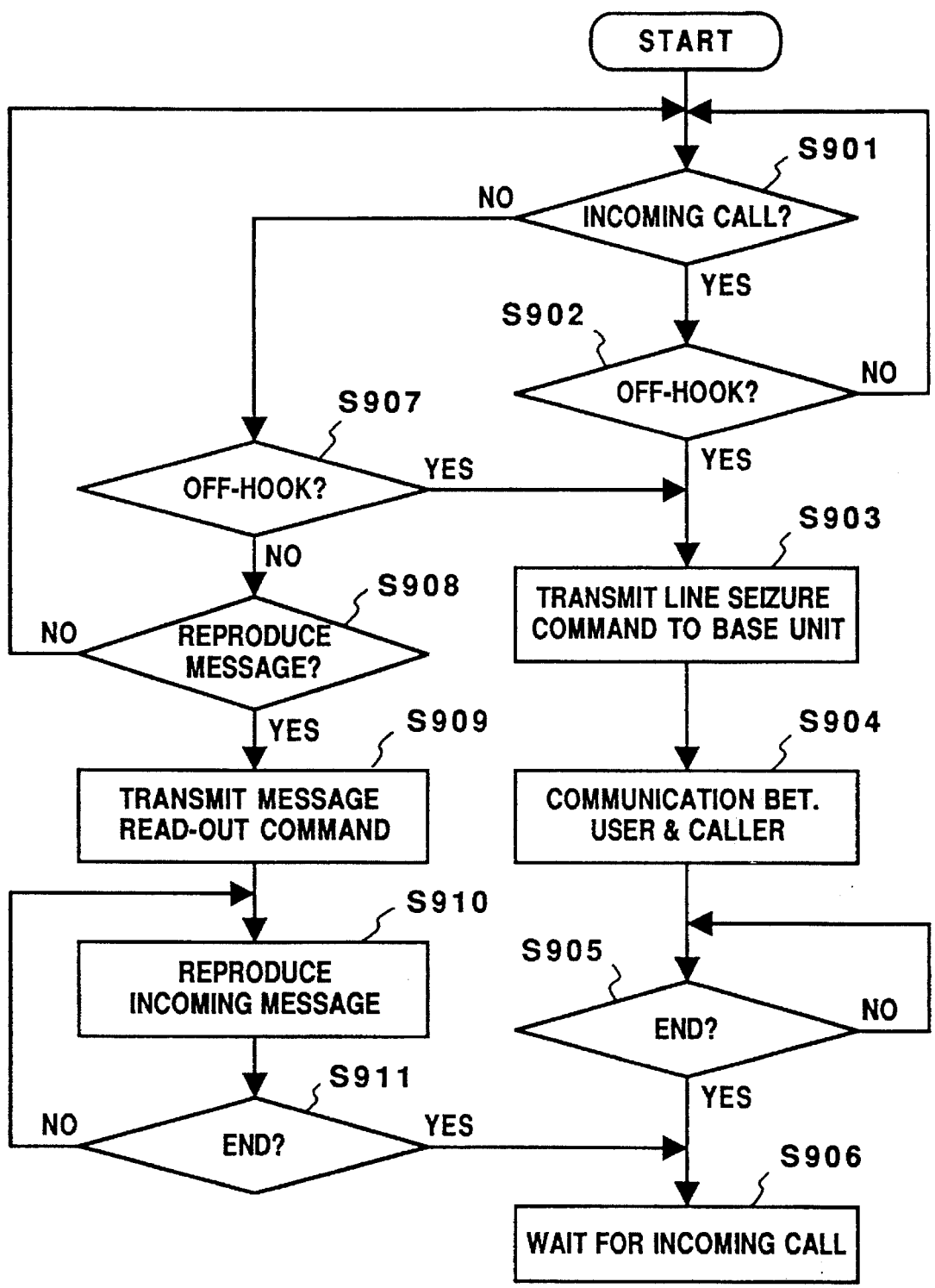
FIG. 9 is a flowchart illustrating the processing operation of the phone in the wireless telephone system according to the second embodiment.

Next, the processing operation of the phone 2 will be explained in accordance with the flowchart of FIG. 9. The operation described in the flowchart of FIG. 9 is carried out by the controller 8.

First, in step S901, the controller 8 examines whether there is an incoming-call tone issuing command from the base unit. The incoming-call tone issuing command is a command which informs the phone 2 of an incoming call and urges to issue an incoming-call tone. When the incoming-call tone issuing command arrives, the controller 8 examines that the phone 2 is in off-hook statues in step S902. If the phone 2 is not in the off-hook status, the controller 8 awaits till the status becomes off-hook. If the phone 2 is in the off-hook status, the controller 8 transmits a line connection command from the radio transmitter 9 to the base unit 3 in step S903. In response to the command, the base unit 3 connects the phone 2 with the telephone line 16. Thus the phone 2 is in communication status (telephone call between the user and the caller) in step S904.

When the communication starts, the controller 8 waits for the end of the communication in step S905. Thereafter, the controller waits for another incoming-call issuing command in step S906.

The termination of the communication in step S905 can be determined in the case where the base unit detects that the caller hung up.

In step S901, if there is no incoming call, the controller 8 examines whether the phone is in off-hook status in step S907. If it is in the off-hook status, the process proceeds to step S903 for the communication between the user and the caller.

If the phone is not in the off-hook status, the controller 8 examines whether reproduce of incoming message is designated by manual operation in the operation unit 13. If the reproduce of incoming message is not designated, the processing returns to step S901.

When the reproduce of incoming message is designated, the controller 8 transmits a message read-out command with an ID code of the phone 2 to the base unit 3 in step S909 and reproduces an incoming message sent from the base unit in response to the message read-out command as a voice message in step S910. In step S911, the controller 8 examines whether the message from the base unit 3 is over and repeats to reproduce the message till the message ends. Then the processing proceeds to step S906.

As described above, the wireless telephone system based on the second embodiment enables recording of an incoming message corresponding to the addressee phone and reproduce of the message in the addressee phone. Since only the addressee phone can reproduce the message to the addressee phone, a third person who does not have the addressee phone can not listen to the message.

In this embodiment, though the number of the phone 2 is three, the number is not limited to three. In the designation of the reproduce of an incoming message from the phone 2, manual input of an individual code number of the phone 2 can strengthen the retention of secrets from the third person.

[Third Embodiment]

In the second embodiment, the memory 72 is divided into memory spaces respectively corresponding to the phones $2_1$ to $2_3$. If each of the phones has an individual ID code which is to be recorded with an incoming message, the same effect can be attained.

Figure 11:
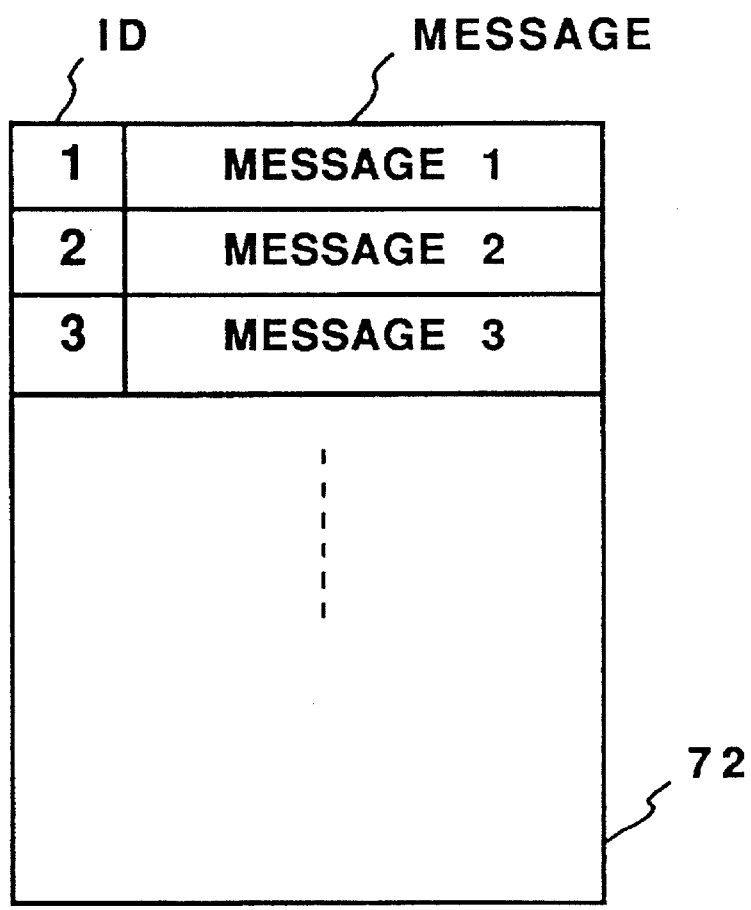
FIG. 11 is an diagram illustrating an example of recording of incoming messages in the wireless telephone system according to the third embodiment.

FIG. 11 illustrates the memory 72 in which incoming messages are stored with their respective ID codes. In FIG. 11, messages 1, 2 and 3 are stored. The messages 1, 2 and 3 have individual ID codes 1, 3 and 2 respectively.

The construction of the base unit 3 and the phone 2 for the wireless telephone system according to the third embodiment is that of the second embodiment. However, the operation of the controller 15 in the base unit 3 and that of the controller 8 in the phone 2 are different from those in the second embodiment.

In this embodiment, incoming messages are recorded sequentially. The processing operation in the base unit 3 is similar to that in the flowchart of FIG. 8 except step S806. In the second embodiment, the controller 15 sets an address in the memory 72 in accordance with the selected phone. In the third embodiment, the controller 15 records an ID code corresponding to the selected phone and records the incoming message in the next place in the memory 72.

When an incoming message is reproduced, the controller 8 reads the messages out of the memory 72, from,the message recorded first to the message recorded last. The controller 8 reproduces only the message with the ID code identical to that of the phone which has transmitted the message reproduce command. On the side of the base unit 3, in step S816 of the flowchart of FIG. 8, the controller 15 reads out the contents of the memory 72 to examine ID codes and transmits only the message with the ID code identical to that of the phone which has transmitted the message reproduce command. The above construction makes good use of the memory 72 even when many of the messages are directed to a specific phone.

In this embodiment, though the phone selection signal (ID code) is a DTMF signal, a similar system can be constructed using a voice signal for the DTMF signal.

The present invention is not limited to the above embodiments and various changes and modifications can be made within the spirit and scope of the present invention. Therefore, to apprise the public of the scope of the present invention, the following claims are made.

What is claimed is:

1. A wireless telephone system having a plurality of phones and a base unit which is connected to a telephone line and which communicates with said plurality of phones, said base unit comprising first storage means for storing an outgoing message to be transmitted to the telephone line in response to an incoming call, reception means for receiving a selection signal sent from a calling party to select one of said plurality of phones, and transmission means for transmitting an incoming message from said telephone line to one of said plurality of phones selected by the selection signal so as to store the incoming message in the selected phone, and each of said plurality of phones comprising second reception means for receiving the incoming message transmitted by said transmission means, second storage means for storing the incoming message received by said second reception means, and control means for controlling said second storage means to store the incoming message received by said second reception means.

2. The system according to claim 1, wherein said second storage means reproduces the stored incoming message.

3. The system according to claim 1, wherein said base unit comprises selection means for selecting one of said plurality of phones in accordance with the selection signal from the calling party.

4. The system according to claim 3, wherein said selection means selects one of said plurality of phones in accordance with a DTMF (dual tone multi-frequency) signal from the calling party.

5. The system according to claim 1, wherein said second storage means consists of a LSI (large scale integrated circuit).

6. A wireless telephone system having a plurality of phones and a base unit which is connected to a telephone line and which communicates with said plurality of phones, said base unit comprising:

first storage means for storing an outgoing message to be transmitted to the telephone line in response to an incoming call;

selection means for selecting one of said plurality of phones in accordance with a DTMF signal sent by a calling party to select one of said plurality of phones; and transmission means for transmitting an incoming message from the telephone line to one of said plurality of phones selected by said selection means so as to store the incoming message in the selected phone, each of said plurality of phones comprising second storage means for storing the incoming message transmitted by said transmission means; and control means for controlling said storage means to store the incoming message in said storage means.

7. The system according to claim 6, wherein said second storage means reproduces the stored incoming message.

8. A wireless telephone system having a plurality of phones and a base unit which is connected to a telephone line and which communicates with said plurality of phones, comprising:

storage means for storing an outgoing message to be transmitted to the telephone line in response to an incoming call;

recording means for recording an incoming message from said telephone line corresponding to each of said plurality of phones in accordance with a selection signal sent from a calling party to select one of said plurality of phones; and transmission means for transmitting the incoming message recorded by said recording means to one of said plurality of phones to which the incoming message corresponds according to a request for transmitting the recorded message from the phone, each of said plurality of phones comprising reproduction means for reproducing the incoming message transmitted by said transmission means.

9. The system according to claim 8, wherein said recording means records the incoming message to one of said plurality of phones in an area corresponding to one of said plurality of phone, and said transmission means transmits the incoming message from one of said plurality of phones.

10. The system according to claim 8, wherein said recording means records an identifier corresponding to one of said plurality of phones which is included in the incoming message, and said transmission means transmits the incoming message recorded by said recording means with the identifier corresponding to one of the plurality of phones.

11. The system according to claim 8, wherein said recording means comprises selection means for selecting one of said plurality of phones in accordance with a DTMF signal from a calling side.

12. The system according to claim 8, wherein said recording means consists of a LSI.

13. The system according to claim 8, wherein said recording means comprises selection means for selecting one of said plurality of phones.

14. The system according to claim 8, wherein said reproduction means comprises designating means for designating said base unit to transmit the incoming message recorded by said recording means.

15. The system according to claim 8, wherein said recording means comprises receiving means for receiving a selection signal from a communication partner to select one of said plurality of phones.

16. The system according to claim 8, wherein said transmission means transmits the incoming message according to a command from one of said plurality of phones.

17. The system according to claim 1, wherein said transmission means comprises selection means for selecting one of said plurality of phones in accordance with a selection signal from a communication partner.

18. The system according to claim 1, wherein said first storage means comprises second transmission means for transmitting the outgoing message to the telephone line.

19. The system according to claim 1, wherein said transmission means transmits a call signal to one of said plurality of phones when an incoming call arrives, and transmits the incoming message to one of said plurality of phones.

20. The system according to claim 6, wherein said first storage means comprises second transmission means for transmitting the outgoing message to the telephone line.

21. The system according to claim 6, wherein said transmission means transits a call signal to one of said plurality of phones when an incoming call arrives, and transits the incoming message to one of said plurality of phones.

22. A base unit for connecting a plurality of radio phones, comprising:

storage means for storing an outgoing message to be transmitted to a telephone line in response to an incoming call;

recording means for recording an incoming message corresponding to each of the plurality of radio phones in accordance with a selection signal sent from a calling party to select one of said plurality of radio phones;

reception means for receiving a message request from one of the plurality of radio phones; and transmission means for transmitting the incoming message, recorded by said recording means, corresponding to a radio phone from which the message request is sent to the radio phone.

23. The base unit according to claim 22, wherein said recording means records the incoming message to one of the plurality of radio phones in an area corresponding to one of the plurality of radio phones, and said transmission means transmits the incoming message from the area corresponding to one of the plurality of radio phones.

24. The base unit according to claim 22, wherein said recording means records an identifier corresponding to one of the plurality of radio phones which is included in the incoming message, and said transmission means transmits the incoming message recorded by said recording means with the identifier corresponding to one of the plurality of radio phones.

25. The base unit according to claim 22, wherein said receiving means comprises selection means for selecting one of the plurality of radio phones in accordance with a DTMF signal from the calling party.

26. The base unit according to claim 22, wherein said recording means comprises selection means for selecting one of the plurality of radio phones in accordance with the selection signal.

27. The base unit according to claim 22, wherein said recording means comprises receiving means for receiving a selection signal from a communication partner to select one of the plurality of radio phones.

28. The base unit according to claim 22, wherein said recording means comprises a LSI (Large Scale Integrated circuit).

29. A method for controlling a wireless communication system having a master unit and a plurality of slave units, comprising the steps of:

transmitting an outgoing message to a calling party in response to an incoming call from the master unit;

receiving a selection signal sent from a calling party to select one of a plurality of the slave units at the master unit;

transmitting an incoming message sent from the calling party to one of said plurality of slave units selected by the selection signal so as to store the incoming message in the selected phone; and storing the incoming message transmitted from said master unit at each of the plurality of slave units.

30. The method according to claim 29, a call signal in the form of the radio signal for selecting one of said plurality of slave units is transmitted to the selected slave unit from the master unit at the step of transmitting the incoming message.

31. The method according to claim 29, wherein the incoming message is stored in an audio memory at the step of storing the incoming message.

32. A method for controlling a wireless communication system having a master unit and a plurality of slave units, comprising the steps of:

recording an incoming message from a calling party corresponding to each of the plurality of slave units in the master unit;

transmitting the recorded incoming message in a form of a radio signal to one of the plurality of slave units which requests to transmit the recorded incoming message; and reproducing the incoming message transmitted from said master unit in the form of the radio signal in the slave unit which requests to transmit the recording incoming message.

33. The system according to claim 32, wherein one of said plurality of slave units corresponding to the destination reproduces the incoming message.

34. The system according to claim 32, wherein said master unit transmits the incoming message according to a request from one of said plurality of slave units.

35. The method according to claim 32, wherein an outgoing message to be transmitted to the calling party in response to the incoming message is stored in said master unit.

36. The method according to claim 32, wherein an outgoing message is transmitted to the calling party in response to the incoming message at the step of recording the incoming message.

37. The system according to claim 32, wherein each of said plurality of slave units includes an audio memory.

38. The method according to claim 32, wherein a selection signal from the calling party is received at the step of recording the incoming message.

39. A wireless telephone system having a plurality of phones and a base unit which is connected to a telephone line and which communicates with said plurality of phones, said base unit comprising detection means for detecting a selection signal sent from a calling party to select one of said plurality of phones, selection means for selecting one of said plurality of phones in accordance with the selection signal from the calling party, transmission means for transmitting an incoming message from the calling party to one of said plurality of phones selected by said selection means so as to store the incoming message in the selected phone;

each of said plurality of phones comprising: storage means for storing the incoming message transmitted by said transmission means;

control means for controlling said storage means to store the incoming message transmitted by said transmission means, and reproduction means for reproducing the incoming message stored by said storage means.

40. The system according to claim 39, wherein said selection signal is a DTMF signal from the calling party.

41. A wireless telephone system having a plurality of phones and a base unit which is connected to a telephone line and which communicates with said plurality of phones, comprising:

recording means for recording an incoming message from a calling party corresponding to each of said plurality of phones in accordance with a selection signal sent from the calling party to select one of said plurality of phones, and transmission means for transmitting the incoming message recorded by said recording means to one of said plurality of phones to which the incoming message corresponds in accordance with a request for transmitting the recorded incoming message from the phone, each of said plurality of phones comprising reproduction means for reproducing the incoming message transmitted by said transmission means and request means for requesting said base unit to transmit the recorded message.

42. The system according to claim 41, wherein said selection signal is a DTMF signal from the calling party.

43. A phone included in a wireless telephone system having a plurality of phones and a base unit which communicates with one of the plurality of phones selected by a selection signal from a calling party via a telephone line and stores an outgoing message to be transmitted to the telephone line, comprising:

reception means for receiving an incoming message from the calling party which transmits the selection signal to select the phone;

storage means for storing the incoming message received by said reception means; and control means for controlling said storage means to store the incoming message received by said reception means in said storage means.

44. The phone according to claim 43, further comprising reproduction means for reproducing the incoming message stored in said storage means.

\* \* \* \* \*

UNITED STATES PATENT AND TRADEMARK OFFICE
CERTIFICATE OF CORRECTION

PATENT NO. : 5,592,532
DATED : January 7, 1997
INVENTOR(S) : Shigeru KOIZUMI

It is certified that error appears in the above-indentified patent and that said Letters Patent is hereby corrected as shown below:

ON THE COVER PAGE:

Under References Cited, FOREIGN PATENT DOCUMENTS

Item [56], "109929    4/1989    Japan
          60-20110  2/1994    Japan" should read
       --1-109929   4/1989    Japan
          6-30110   2/1994    Japan--.

COLUMN 1

Line 60, "integrated" should read --integrated)--;

Line 61, "circuit)." should read --circuit--.

COLUMN 2

Line 23, "advantageous" should read --advantages--.

COLUMN 4

Line 23, "step" should read --step S8.--

COLUMN 5

Line 52, "waits" should read --awaits--.

UNITED STATES PATENT AND TRADEMARK OFFICE
CERTIFICATE OF CORRECTION

Page 2 of 2

PATENT NO. : 5,592,532
DATED : January 7, 1997
INVENTOR(S) : Shigeru KOIZUMI

It is certified that error appears in the above-indentified patent and that said Letters Patent is hereby corrected as shown below:

COLUMN 10

Line 36, "phone," should read --phones,--.

COLUMN 11

Line 11, "transits" should read --transmits--;

Line 12, "transits" should read --transmits--.

COLUMN 12

Line 5, "claim 29," should read --claim 29, wherein--.

Signed and Sealed this

Eighth Day of July, 1997

Attest:

BRUCE LEHMAN

Attesting Officer

Commissioner of Patents and Trademarks